United States Patent
Lee

(10) Patent No.: US 6,196,611 B1
(45) Date of Patent: Mar. 6, 2001

(54) DEVICE FOR MOUNTING AND DISMOUNTING VEHICLE SEAT

(75) Inventor: Hak-sang Lee, Seoul (KR)

(73) Assignee: KIA Motors Corporation, Seoul (KR)

( * ) Notice: Subject to any disclaimer, the term of this patent is extended or adjusted under 35 U.S.C. 154(b) by 0 days.

(21) Appl. No.: 09/610,365

(22) Filed: Jul. 5, 2000

(30) Foreign Application Priority Data

Aug. 31, 1999 (KR) .................................................. 99-36507

(51) Int. Cl.[7] .......................................................... B60N 2/08
(52) U.S. Cl. ........................................................ 296/65.03
(58) Field of Search ......................................... 296/65.03

(56) References Cited

U.S. PATENT DOCUMENTS

| | | | |
|---|---|---|---|
| 5,372,398 | * 12/1994 | Aneiros et al. | 296/65.03 |
| 5,474,311 | * 12/1995 | Tyciak et al. | 296/65.03 |
| 5,547,242 | * 8/1996 | Dukatz et al. | 296/65.03 |
| 5,765,894 | * 6/1998 | Okazaki et al. | 296/65.03 |
| 6,036,252 | * 3/2000 | Hecksel et al. | 296/65.03 |

* cited by examiner

Primary Examiner—Gary C. Hoge
(74) Attorney, Agent, or Firm—Finnegan, Henderson, Farabow, Garrett & Dunner, L.L.P.

(57) ABSTRACT

Disclosed is a device for mounting and dismounting a vehicle seat. The device comprises a pair of first mounting and dismounting sections each having a first locker which is connected to a front catch-release lever in a manner such that the first locker is able to be locked to and unlocked from a front striker, the front catch-release lever being elastically supported by a first spring; a pair of second mounting and dismounting sections having a pair of second lockers, respectively, which are connected with each other by a rear catch-release lever in a manner such that each of the pair of second lockers is able to be locked to and unlocked from a rear striker, the rear catch-release lever being elastically supported by a second spring and having a rod-shaped configuration; and a pair of roller sections each located outside the first and second mounting and dismounting sections at a side of the seat cushion and each including front and rear roller plates which have front and rear rollers rotatably coupled thereto, respectively, the front and rear roller plates being connected with each other by a link in a manner such that they are able to be pivoted by manipulating a roller operating lever.

6 Claims, 6 Drawing Sheets

DEVICE FOR MOUNTING AND DISMOUNTING VEHICLE SEAT

BACKGROUND OF THE INVENTION

1. Field of the Invention

The present invention relates to a device for mounting and dismounting a vehicle seat, and more particularly, the present invention relates to a device for mounting and dismounting a vehicle seat, which enables the vehicle seat to be easily mounted to and dismounted from a floor panel of a vehicle as occasion demands, thereby, in the case of dismounting the vehicle seat from the floor panel of the vehicle, allowing the vehicle seat to be conveniently moved to and stored in a desired place in a state wherein a seat back of the vehicle seat is folded to a seat cushion of the vehicle seat.

2. Description of the Related Art

Generally, a vehicle seat having a seat cushion and a seat back is mounted onto a floor panel which delimits a lower surface of a passenger compartment, thereby to render comfortableness to passengers.

However, the conventional vehicle seat suffers from defects in that, since the vehicle seat is fixedly secured to the floor panel, in the case of carrying bulky cargo, it is inconvenient to load the bulky cargo into the passenger compartment. Further, when it is required to utilize a portion of the passenger compartment as a freight loading space, space utilization efficiency is deteriorated due to the fixedly secured vehicle seat.

To cope with these problems, a device for mounting and dismounting a vehicle seat, a typical example of which is illustrated in FIGS. 1 and 2, is disclosed in the art. Referring to FIGS. 1 and 2, a pair of supporting members 20' are secured to a lower surface of a seat cushion 11' of a vehicle seat 10' at both sides of the lower surface, respectively. A pair of rollers 50' are rotatably arranged adjacent to front and rear ends of each supporting member 20', respectively, in such a manner that they project downward beyond a lower end surface of the supporting member 20'. A first locker 60' is fastened to the front end of the supporting member 20' and is formed with an engaging groove 61'. A first striker 40' which is disposed at a front end of a recess 31' defined in the floor panel 30', can be engaged into and disengaged from the engaging groove 61' of the first locker 60'. A second locker 70' is fastened to the rear end of the supporting member 20'. The second locker 70' can be locked to and unlocked from a second striker 40' which is disposed at a rear end of the recess 31' defined in the floor panel 30'. The second locker 70' can be pivoted about a shaft by the manipulation of a lever 71'.

In the conventional device for mounting and dismounting a vehicle seat, constructed as mentioned above, in the case that the vehicle seat 10' is mounted to the floor panel 30', the first striker 40' which is disposed at the front end of the recess 31' defined in the floor panel 30', is first engaged into the engaging groove 61' of the first locker 60' which is fastened to the front end of the supporting member 20'. In this state, by locking the second locker 70' which is fastened to the rear end of the supporting member 20', to the second striker 40' which is disposed at the rear end of the recess 31', the vehicle seat 10' is fixedly secured to an upper surface of the floor panel 30'. Also, in the case that the vehicle seat 10' is dismounted from the floor panel 30', the lever 71' is first pulled to unlock the second locker 70' from the second striker 40'. Then, by raising the vehicle seat 10' upward to completely disengage the first striker 40' from the engaging groove 61' of the first locker 60', the vehicle seat 10' can be moved to a desired place using the rollers 50'.

Consequently, as occasion demands, it is possible to transport bulky cargo in a state wherein it is loaded on the floor panel 30', whereby space utilization efficiency is enhanced.

Further, due to the fact that the dismounted vehicle seat 10' can be moved by being pushed in a state wherein the rollers 50', which are arranged adjacent to front and rear ends of the pair of supporting members 20', are brought into contact with the upper surface of the floor panel 30', it is convenient for a person to remove the vehicle seat 10' from the passenger compartment and move and store in a desired place.

However, the conventional device for mounting and dismounting a vehicle seat still encounters with a problem in that, because the first locker 60' simply serves as a rotation support shaft in a state wherein the first striker 40' which is disposed at the front end of the recess 31', is engaged into the engaging groove 61' formed in the first locker 60' which is fastened to the front end of the supporting member 20', if impact is applied to the vehicle due to a vehicular accident while the vehicle seat 10' is mounted to the floor panel 30' of the vehicle, the second locker 70' is easily unlocked from the second striker 40' which is disposed at the rear end of the recess 31', whereby the likelihood for a passenger seating on the vehicle seat 10' to be severely injured is increased.

SUMMARY OF THE INVENTION

Accordingly, the present invention has been made in an effort to solve the problems occurring in the related art, and an object of the present invention is to provide a device for mounting and dismounting a vehicle seat, which enables the vehicle seat to be securely locked to strikers in the case of mounting the vehicle seat to a floor panel of a vehicle and at the same time to be quickly and conveniently unlocked from the strikers in the case of dismounting the vehicle seat from the floor panel of the vehicle as occasion demands.

In order to achieve the above object, according to the present invention, there is provided a device for mounting and dismounting a vehicle seat, the device being arranged on a pair of supporting members separately secured to a lower surface of a seat cushion of the vehicle seat thereby to allow the vehicle seat to be mounted to and dismounted from a floor panel of a vehicle as occasion demands, the device comprising: a pair of first mounting and dismounting sections each having a first locker which is connected to a front catch-release lever in a manner such that the first locker is able to be locked to and unlocked from a front striker which is disposed in a front recess defined in the floor panel of the vehicle, the front catch-release lever being elastically supported by a first spring; a pair of second mounting and dismounting sections having a pair of second lockers, respectively, which are connected with each other by a rear catch-release lever in a manner such that each of the pair of second lockers is able to be locked to and unlocked from a rear striker which is disposed in a rear recess defined in the floor panel of the vehicle, the rear catch-release lever being elastically supported by a second spring and having a rod-shaped configuration; and a pair of roller sections each located outside the first and second mounting and dismounting sections at a side of the seat cushion and each including front and rear roller plates which have front and rear rollers rotatably coupled thereto, respectively, the front and rear roller plates being connected with each other by a link in a manner such that they are able to be pivoted by manipulating a roller operating lever.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
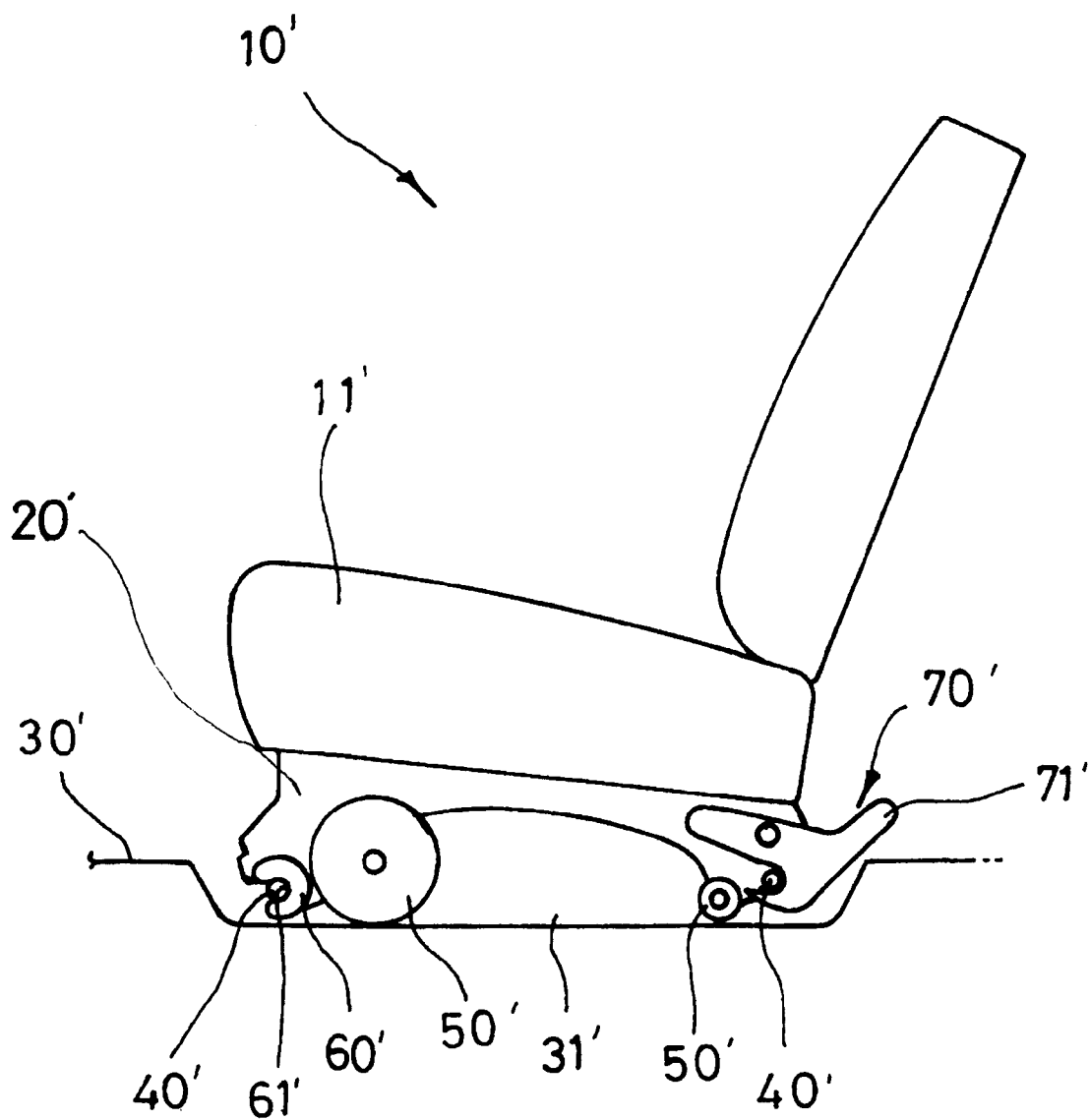
FIG. 1 is a side view illustrating a state wherein a vehicle seat is mounted to a floor panel of a vehicle by means of a device for mounting and dismounting a vehicle seat, according to the conventional art.
Figure 2:
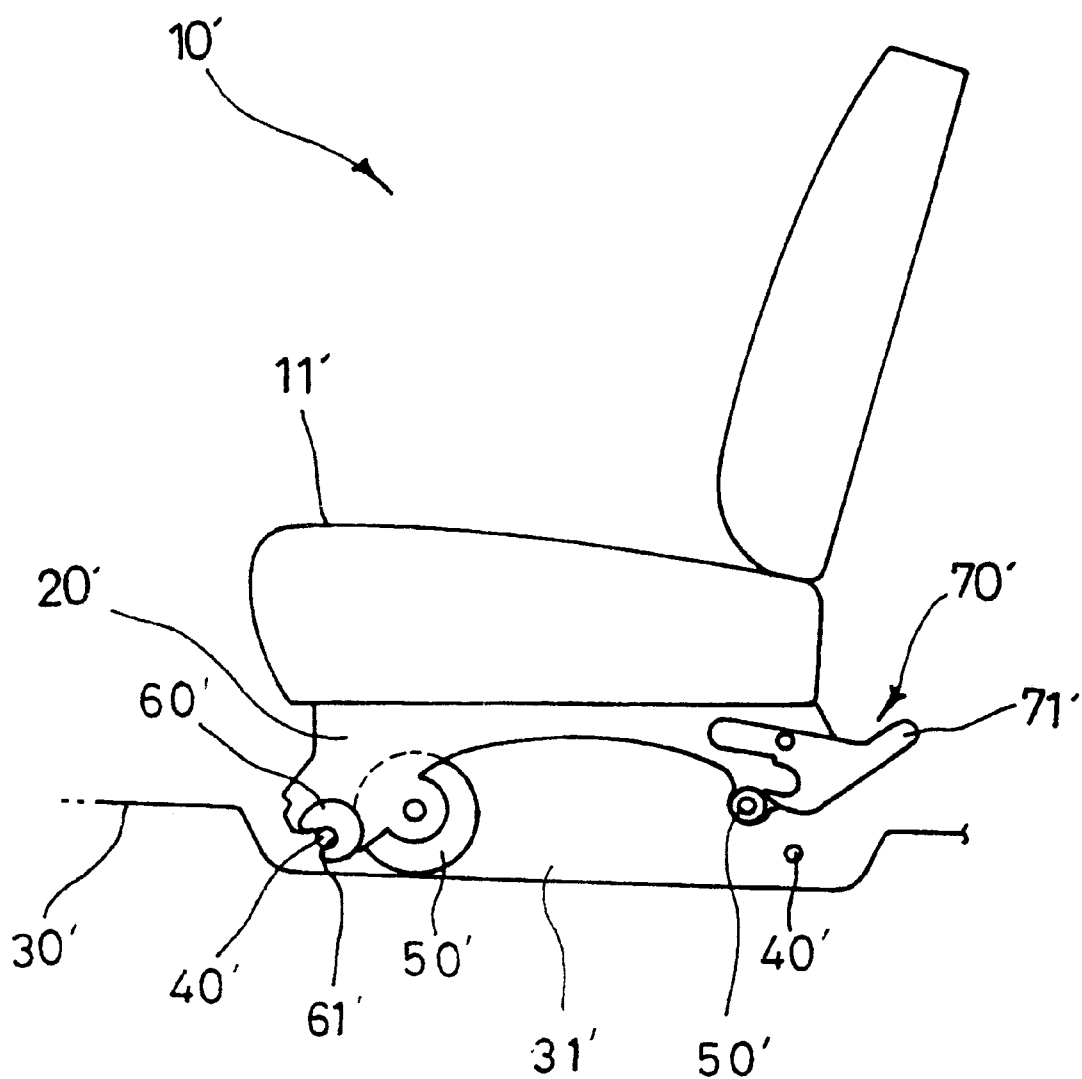
FIG. 2 is a side view illustrating another state wherein the vehicle seat of FIG. 1 is dismounted from the floor panel of the vehicle by means of the device for mounting and dismounting a vehicle seat, according to the conventional art.

Reference will now be made in greater detail to a preferred embodiment of the invention, an example of which is illustrated in the accompanying drawings. Wherever possible, the same reference numerals will be used throughout the drawings and the description to refer to the same or like parts.

A device for mounting and dismounting a vehicle seat, in accordance with an embodiment of the present invention, is arranged on a pair of supporting members 3 which are separately secured to a lower surface of a seat cushion 2 of a vehicle seat 1, thereby to allow the vehicle seat 1 to be mounted to and dismounted from a floor panel 4 of a vehicle as occasion demands. The device includes a pair of first mounting and dismounting sections 10, a pair of second mounting and dismounting sections 14, and a pair of roller sections 19. Each of the pair of first mounting and dismounting sections 10 has a first locker 9 which is connected to a front catch-release lever 8 in a manner such that the first locker 9 is able to be locked to and unlocked from a front striker 6a which is disposed in a front recess 5 defined in the floor panel 4 of the vehicle. The front catch-release lever 8 is elastically supported by a first spring 7. The pair of second mounting and dismounting sections 14 have a pair of second lockers 13, respectively, which are connected with each other by a rear catch-release lever 12 in a manner such that each of the pair of second lockers 13 is able to be locked to and unlocked from a rear striker 6b which is disposed in a rear recess 5 defined in the floor panel 4 of the vehicle. The rear catch-release lever 12 is elastically supported by a second spring 11 and has a rod-shaped configuration. Each of the pair of roller sections 19 is located outside the first and second mounting and dismounting sections 10 and 14 at a side of the seat cushion 2 and includes front and rear roller plates 17a and 17b which have front and rear rollers 18a and 18b rotatably coupled thereto, respectively. The front and rear roller plates 17a and 17b are connected with each other by a link 16 in a manner such that they are able to be pivoted by manipulating a roller operating lever 15.

The pair of first mounting and dismounting sections 10 are arranged at front ends of the pair of supporting members 3, respectively. The pair of supporting members 3 are secured to the lower surface of the seat cushion 2 of the vehicle seat 1 in a manner such that they are spaced apart by a predetermined distance. Because the pair of first mounting and dismounting sections 10 have the same construction, hereinafter, only one of the pair of first mounting and dismounting sections 10 will be mainly described in detail. As described above, the first mounting and dismounting section 10 has the first locker 9. The first locker 9 is rotated about a front center shaft 20 by the manipulation of the front catch-release lever 8 in such a manner that it is locked to and unlocked from the front striker 6a. If external force applied to the front catch-release lever 8 is removed, the first locker 9 is returned to its original position by the elastic force of the first spring 7.

On the other hand, the pair of second mounting and dismounting sections 14 are arranged at rear ends of the pair of supporting members 3, respectively. The pair of second mounting and dismounting sections 14 are connected with each other by the single rear catch-release lever 12 which has the rod-shaped configuration, thereby to be simultaneously operated. In each of the pair of second mounting and dismounting sections 14, if the rear catch-release lever 12 is manipulated, the second locker 13 is pivoted about a rear center shaft 21 in such a manner that it is locked to and unlocked from the rear striker 6b. If external force applied to the rear catch-release lever 12 is removed, the second locker 13 is returned to its original position by the elastic force of the second spring 11.

Figure 5:
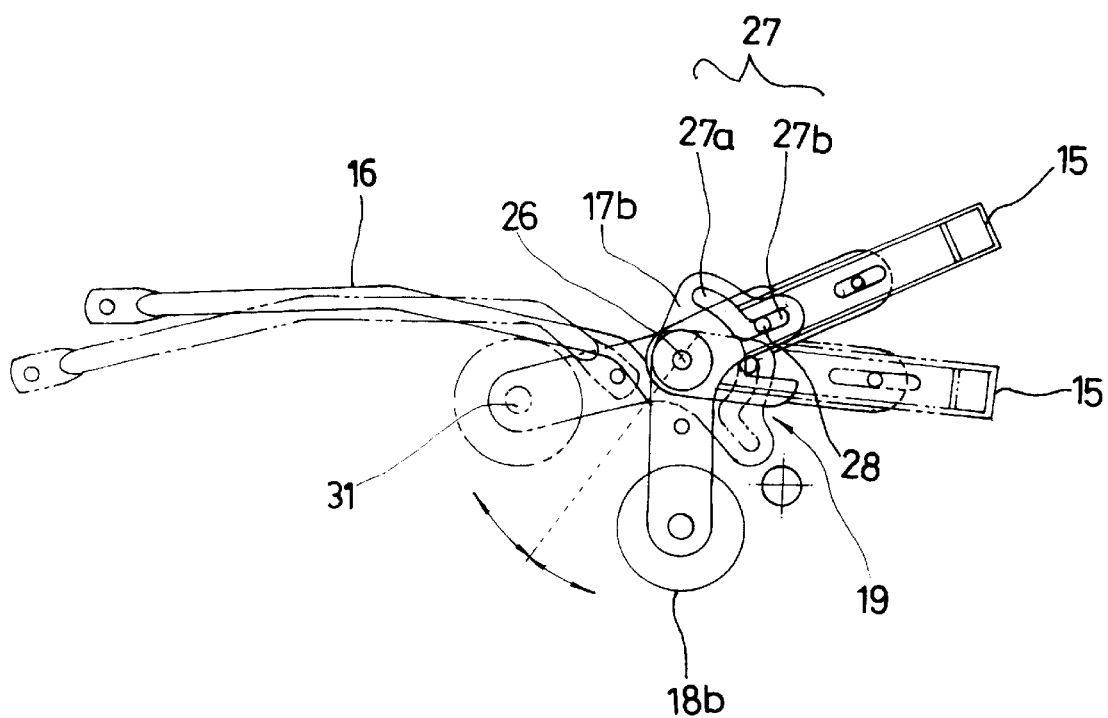
FIG. 5 is an enlarged side view illustrating an operation of a roller section which is a main component of the device according to the present invention.
Figure 6:
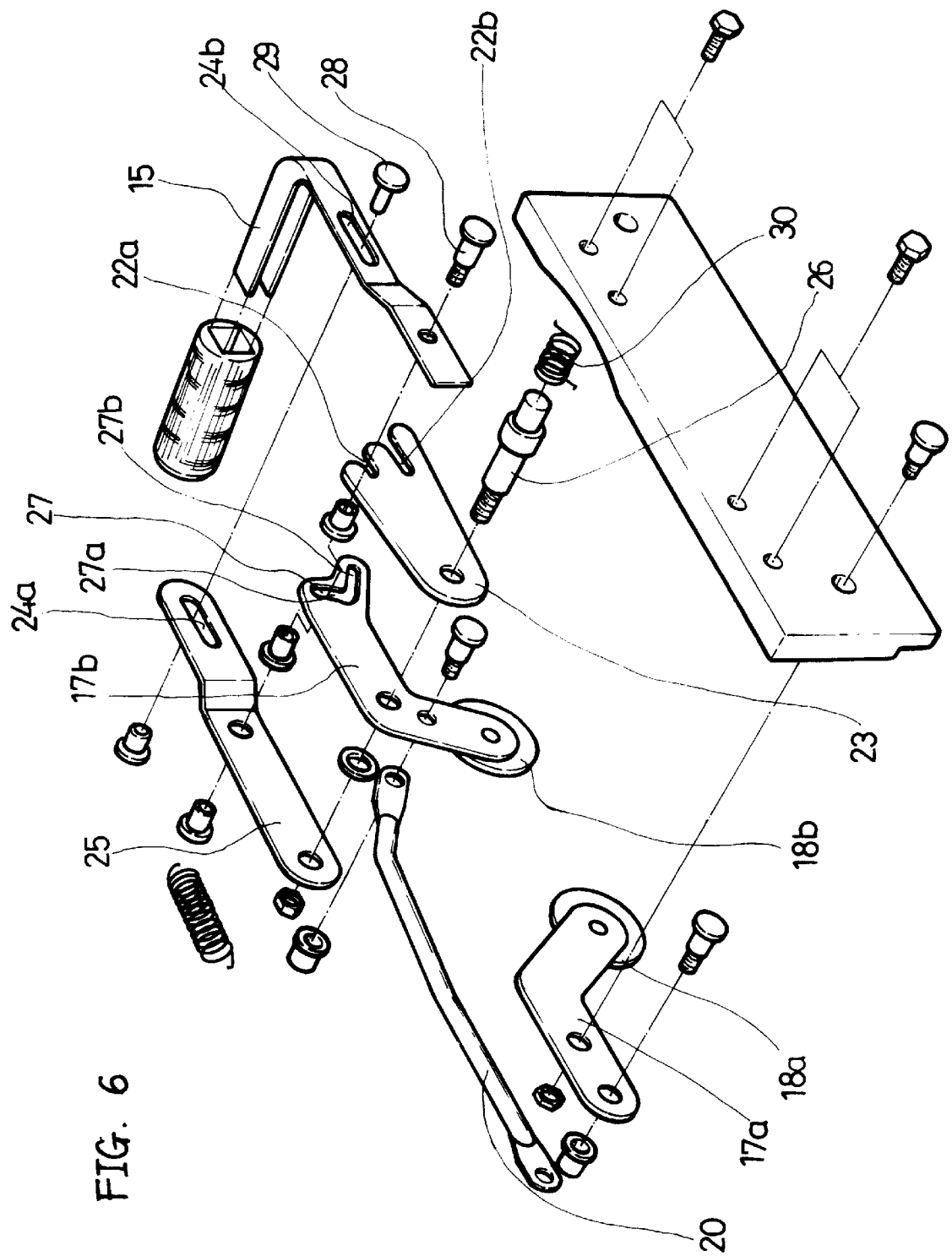
FIG. 6 is an exploded perspective view of the roller section of FIG. 5.

Further, in the roller section 19 as shown in FIGS. 5 and 6, the front and rear rollers 18a and 18b are rotatably coupled to the front and rear roller plates 17a and 17b, respectively. The front and rear roller plates 17a and 17b are integrally connected with each other by the link 16. The front and rear rollers 18a and 18b can be freely rotated about front and rear supporting shafts 31, respectively. A stopper bracket 23 which is formed with upper and lower stopper grooves 22a and 22b and a guide bracket 25 which is formed with a first guide slot 24a, are pivotally connected with each other by a pivot shaft 26 while they sandwich the rear roller plate 17b therebetween. The rear roller plate 17b to which the rear roller 18b is rotatably coupled, is formed adjacent to a rear end thereof with a stopper pin insertion slot 27. The stopper pin insertion slot 27 has a moving slot portion 27a and an operating slot portion 27b which is substantially perpendicular to and communicated with the moving slot portion 27a. A stopper pin 28 which is supported by the roller operating lever 15, is inserted through the stopper pin insertion slot 27.

The roller operating lever 15 is connected with the rear roller plate 17b via the stopper pin 28. The roller operating lever 15 is formed with a second guide slot 24b. A guide pin 29 is inserted through the first guide slot 24a which is defined in the guide bracket 25 and the second guide slot 24b which is defined in the roller operating lever 15 in a manner such that it can be moved forward or rearward along the slots 24a and 24b.

In the meanwhile, between the stopper pin 28 and the pivot shaft 26 which is mounted at a rotating point of the rear roller plate 17b and the stopper bracket 23, there is disposed a third spring 30. The upper and lower stopper grooves 22a and 22b of the stopper bracket 23 are defined in a manner such that a length of the upper stopper groove 22a is smaller than that of the lower stopper groove 22b, thereby enabling the stopper pin 28 to be moved with reduced force when manipulating the roller operating lever 15.

Hereinafter, operations of the device for mounting and dismounting a vehicle seat, according to the present invention, constructed as mentioned above, will be described in detail.

Figure 3:
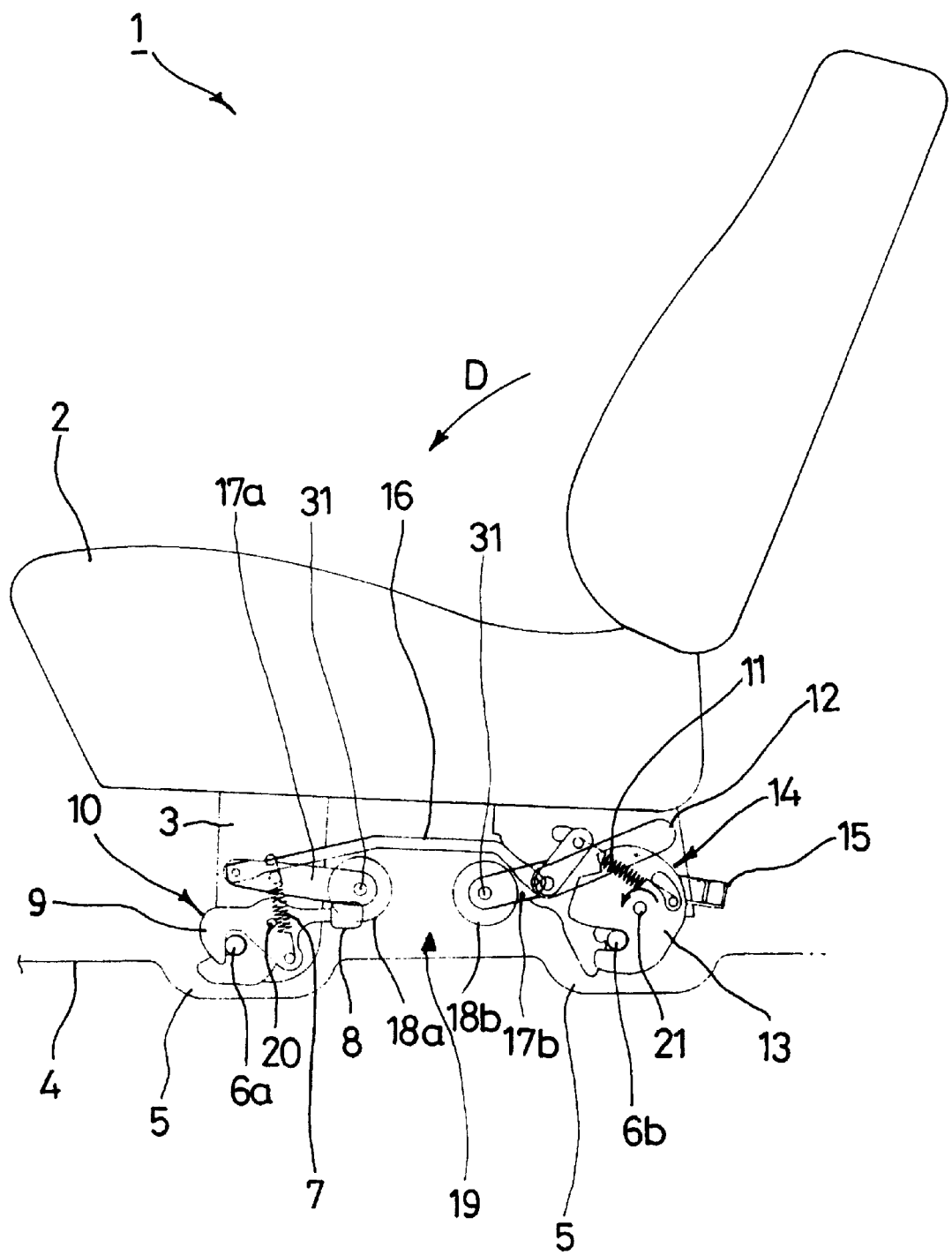
FIG. 3 is a side view illustrating a state wherein a vehicle seat is mounted to a floor panel of a vehicle by means of a device for mounting and dismounting a vehicle seat, in accordance with an embodiment of the present invention.
Figure 4:
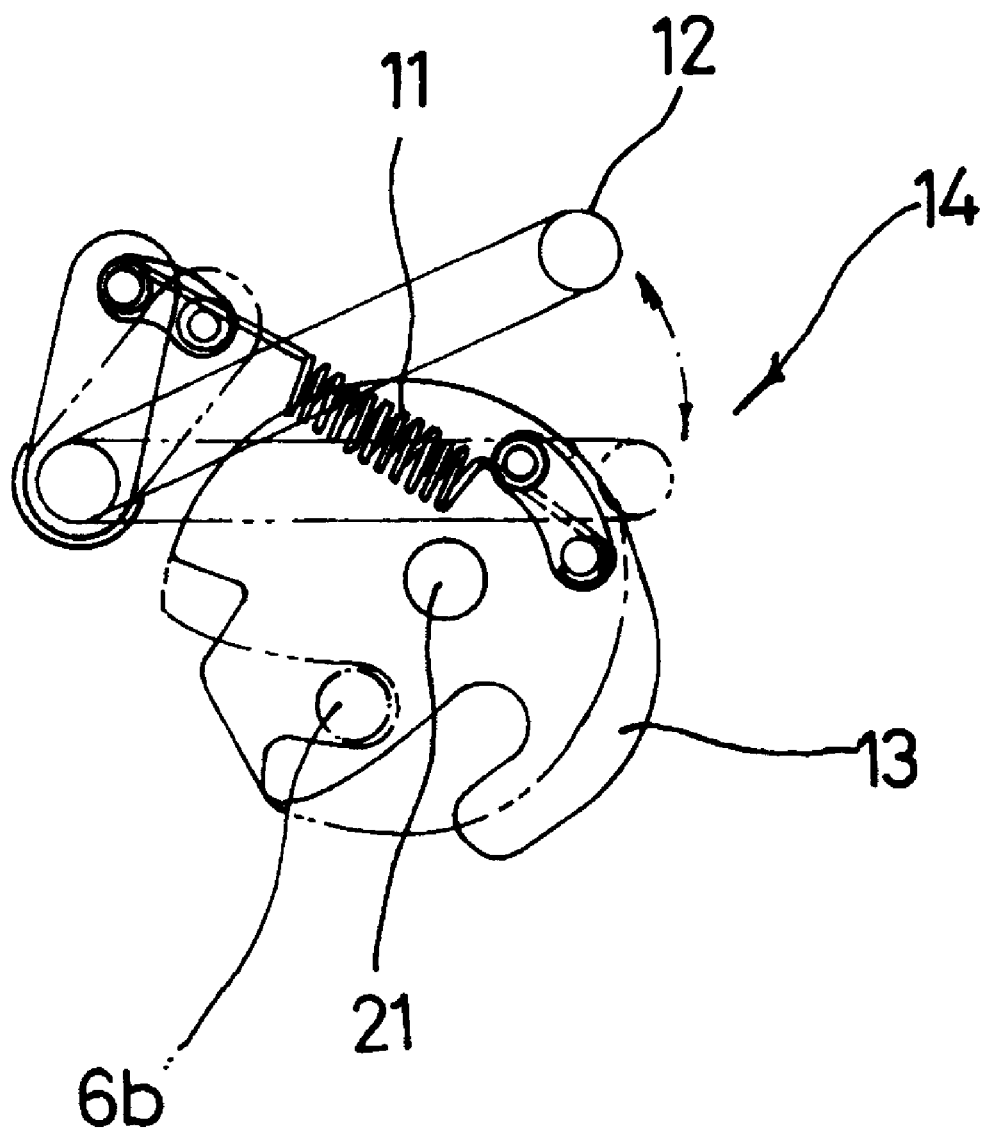
FIG. 4 is an enlarged side view for explaining a locking and unlocking structure between a second mounting and dismounting section and a rear striker in the device according to the present invention.

As shown in FIG. 3, when the vehicle seat 1 is maintained in a mounted state wherein the first and second lockers 9 and 13 are locked to the front and rear strikers 6a and 6b which are disposed in the front and rear recesses 5, respectively, if it is required to dismount the vehicle seat 1 from the floor panel 4 thereby to utilize a volume occupied by the vehicle seat 1 as a freight loading space, the rear catch-release lever 12 which is provided for the pair of second mounting and dismounting sections 14, is first pulled. By this, as shown in FIG. 4, in the second mounting and dismounting section 14, the second locker 13 is pivoted in a counterclockwise direction about the rear center shaft 21 while elongating the second spring 11 and thereupon, is unlocked from the rear striker 6b. At this time, by the fact that the rear catch-release lever 12 is integrally connected with the pair of second lockers 13, the pair of second lockers 13 which are arranged at rear ends of the seat cushion 2 of the vehicle seat 1, are simultaneously unlocked from the rear striker 6b.

After the pair of second lockers 13 are unlocked from the rear striker 6b, if external force which is applied to the rear catch-release lever 12, is removed, the rear catch-release lever 12 is returned to its original position by the elastic force of the pair of second springs 11.

As the pair of second mounting and dismounting sections 14 which are arranged at the rear end of the seat cushion 2 of the vehicle seat 1 are dismounted from the rear striker 6b, the vehicle seat 1 can be rotated in the counterclockwise direction about the front striker 6a. At this time, a seat back of the vehicle seat 1 is first folded to the seat cushion 2, and then the combination of the seat back and the seat cushion 2 is double folded by being rotated about the front striker 6a by a predetermined angle, for example, by 90°.

On the other hand, the first lockers 9 of the pair of first mounting and dismounting sections 10 are structured so that they can be continuously and reliably maintained in the locked state while they are rotated about the front striker 6i a.If the front and rear rollers 18a and 18b of the roller section 19, which are integrally connected with each other by the link 16, are detached from the upper surface of the floor panel 4, the rear roller plate 17b is moved upward about the stopper pin 28 by an angle (about 45°) of the arc-shaped moving slot portion 27a which is defined adjacent to the rear end of the rear roller plate 17b. According to this, the rear roller 18b which is rotatably coupled to a front end of the rear roller plate 17b, is moved downward about the pivot shaft 26 by its own weight. Hence, the front and rear rollers 18a and 18b are located in a manner such that they can be simultaneously operated via the link 16.

Thereupon, if the roller operating lever 15 is pulled rearward, the guide pin 29 which is inserted through the first guide slot 24a of the guide bracket 25 and the second guide slot 24b of the roller operating lever 15, is moved forward, and the stopper pin 28 is disengaged from the lower stopper groove 22b of the stopper bracket 23. In this state, if the roller operating lever 15 is rotated by an angle of about 15°, the stopper pin 28 is inserted into the upper stopper groove 22a of the stopper bracket 23, and the rear roller 18b of the rear roller plate 17b is fixedly maintained. While the roller operating lever 15 is rotated by about 15° as described above, the front and rear rollers 18a and 18b which are connected with each other by the link 16, are rotated downward to their operating positions thereby to be ready to be used.

Thereafter, if the front catch-release lever 8 which is provided to the first mounting and dismounting section 10, is manipulated by being pressed downward, the first locker 9 is unlocked from the front striker 6a, and thereby, the vehicle seat 1 can be completely dismounted from the floor panel 4 to be freely moved. If external force which is applied to the front catch-release lever 8 is removed, the first mounting and dismounting section 10 is returned to its original position about the front center shaft 20 by the elastic force of the first spring 7.

In this way, as the vehicle seat 1 is completely dismounted from the floor panel 4, a driver or a person can easily move the vehicle seat 1 to a desired storing place by adequately using the rollers 18a and 18b which are arranged on the pair of supporting members 3, respectively, of the vehicle seat 1.

On the other hand, when it is required to mount again the vehicle seat 1 to the floor panel 4 in the passenger compartment, the above-described dismounting operations are reversely performed. In other words, the first locker 9 of the first mounting and dismounting section 10 is first locked to the front striker 6a. Then, the rollers 18a and 18b are moved toward the seat cushion 2 by manipulating the roller operating lever 15, and the second locker 13 of the second mounting and dismounting section 14 is locked to the rear striker 6b. Thereupon, by unfolding the seat back which is held folded to the seat cushion 2, the vehicle seat 1 can be securely mounted again to the floor panel 4.

As described above, the device for mounting and dismounting a vehicle seat, according to the present invention, constructed as mentioned above, provides advantages in that, since first and second mounting and dismounting sections arranged below a seat cushion of the vehicle seat are detachably locked to strikers disposed on a floor panel of a vehicle, it is possible to dismount the vehicle seat from the floor panel of the vehicle and utilize a volume occupied by the vehicle seat as a freight loading space, whereby bulky cargo can be loaded into the freight loading space.

Furthermore, even though a vehicular accident occurs in a state wherein a first locker of the first mounting and dismounting section is locked to a front striker and the vehicle seat is pivoted about the front striker, because the vehicle seat is never freed from the floor panel of the vehicle, passengers' safety is ensured.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A device for mounting and dismounting a vehicle seat, the device being arranged on a pair of supporting members separately secured to a lower surface of a seat cushion of the vehicle seat thereby to allow the vehicle seat to be mounted to and dismounted from a floor panel of a vehicle as occasion demands, the device comprising:

a pair of first mounting and dismounting sections each having a first locker which is connected to a front catch-release lever in a manner such that the first locker is able to be locked to and unlocked from a front striker which is disposed in a front recess defined in the floor panel of the vehicle, the front catch-release lever being elastically supported by a first spring;

a pair of second mounting and dismounting sections having a pair of second lockers, respectively, which are connected with each other by a rear catch-release lever in a manner such that each of the pair of second lockers is able to be locked to and unlocked from a rear striker which is disposed in a rear recess defined in the floor panel of the vehicle, the rear catch-release lever being elastically supported by a second spring and having a rod-shaped configuration; and a pair of roller sections each located outside the first and second mounting and dismounting sections at a side of the seat cushion and each including front and rear roller plates which have front and rear rollers rotatably coupled thereto, respectively, the front and rear roller plates being connected with each other by a link in a manner such that they are able to be pivoted by manipulating a roller operating lever.

2. The device as claimed in claim 1, wherein the pair of second mounting and dismounting sections have the pair of second lockers, respectively, which are connected with each other by the single rear catch-release lever which is placed between the pair of supporting members; and the pair of second lockers are locked to and unlocked from the rear striker while they are pivoted about a pair of rear center shafts, respectively.

3. The device as claimed in claim 1, wherein each of the pair of roller sections has the front and rear roller plates which have the front and rear rollers rotatably coupled thereto, respectively, and are integrally connected with each other by the link, a stopper bracket which is formed with upper and lower stopper grooves, and a guide bracket which is formed with a first guide slot, the stopper bracket and the guide bracket being pivotally connected with each other by a pivot shaft while they sandwich the rear roller plate therebetween.

4. The device as claimed in claim 3, wherein the rear roller plate is formed, adjacent to a rear end thereof, with a stopper pin insertion slot having a moving slot portion through which a stopper pin is inserted and an operating slot portion which is substantially perpendicular to and communicated with the moving slot portion.

5. The device as claimed in claim 2, wherein the stopper pin is inserted through a hole which is defined in the roller operating lever, the upper and lower stopper grooves which are defined in the stopper bracket and the stopper pin insertion slot which is defined in the rear roller plate.

6. The device as claimed in claim 5, wherein the upper and lower stopper grooves of the stopper bracket are defined in a manner such that a length of the upper stopper groove is smaller than that of the lower stopper groove.

* * * * *